United States Patent [19]
Tran et al.

[11] Patent Number: 5,541,924
[45] Date of Patent: Jul. 30, 1996

[54] METHOD AND DEVICE FOR CHANNEL CONTENTION AND DATA TRANSMISSION FOR PACKET-SWITCHED SUBSCRIBER UNITS IN A COMMUNICATION SYSTEM

[75] Inventors: Phieu M. Tran, Lincolnwood; Christopher L. Clanton, Chicago; Jeffrey C. Smolinske, Hoffman Estates, all of Ill.

[73] Assignee: Motorola, Inc.

[21] Appl. No.: 509,043

[22] Filed: Jul. 28, 1995

[51] Int. Cl.⁶ .............................. H04J 3/16; H04B 7/212
[52] U.S. Cl. ....................... 370/85.3; 370/94.1; 370/95.3
[58] Field of Search .................................. 370/85.2, 85.3, 370/85.7, 93, 94.1, 94.2, 95.1, 95.3, 60, 60.1; 379/58, 59, 63; 455/53.1, 54.1, 54.2; 371/48, 53; 359/136

[56] References Cited

U.S. PATENT DOCUMENTS

| | | | |
|---|---|---|---|
| 4,612,637 | 9/1986 | Davis et al. | 370/95.3 |
| 5,150,247 | 9/1992 | Sharpe et al. | 359/136 |
| 5,166,929 | 11/1992 | Lo | 370/85.3 |
| 5,239,543 | 8/1993 | Janssens | 370/95.1 |
| 5,299,199 | 3/1994 | Wilson et al. | 370/95.3 |
| 5,303,234 | 4/1994 | Kou | 370/85.2 |
| 5,420,864 | 5/1995 | Dahlin et al. | 370/95.3 |
| 5,483,537 | 1/1996 | Dupuy | 370/95.3 |

OTHER PUBLICATIONS

"The Network Layer II: Satellite And Packet Radio Networks" The Network Layer 1: Point-To-Point Networks, Chapter 5 pp. 249–283.

Primary Examiner—Hassan Kizou
Attorney, Agent, or Firm—Darleen J. Stockley

[57] ABSTRACT

The present invention provides a method (400, 500, 600, 700, 800, 900, 1000) and device (1100, 1200, 1300) for contention for channel access to single-slot subscriber units that are capable of transmitting and receiving data on one time slot per TDMA frame, allowing contention for channel access on any one of the available packet time slots and transmission on the time slot where contention is won. Thus, the present invention eliminates a requirement for a subscriber unit to be assigned to a particular time slot for contention, thereby eliminating the problem of performing load balancing on the time slots.

21 Claims, 14 Drawing Sheets

METHOD AND DEVICE FOR CHANNEL CONTENTION AND DATA TRANSMISSION FOR PACKET-SWITCHED SUBSCRIBER UNITS IN A COMMUNICATION SYSTEM

FIELD OF THE INVENTION

The present invention relates generally to medium access control and data transmission in a communication system, and more particularly to optimization of packet-switched data transmission in a communication system with respect to throughput and delay.

BACKGROUND OF THE INVENTION

In time-division multiple access (TDMA) communication systems, subscriber units communicate with a main station or base site on a basis of non-overlapping transmission bursts that occur in designated time slots. A burst normally consists of a preamble and the information to be transmitted. The preamble usually contains synchronization, control, and routing information. Typically, 'n' time slots occur over a time interval called a frame. The duration of the frame and each time slot generally depends on the system. Since transmission bursts do not overlap, a same carrier frequency may be assigned to all subscriber units that are communicating with a same base site. The shared transmission path from subscriber unit to base site is commonly called the uplink channel. The path of transmission from base site to subscriber unit is called the downlink channel. In general, any available time slot can be used by any subscriber unit. In such a system, there is a need for a method of fairly allocating the time slots to users as the number and location of available time slots changes. The process by which multiple users request and are granted access to the shared transmission channel is called contention.

One well known method for accessing a shared communication medium is the slotted ALOHA technique, described, for example, in the book entitled "Computer Networks" by Andrew S. Tanenbaum, Prentice/Hall, Chapter 6, page 253. Because there is no allocation of time slots for specific subscriber units, it is conceivable that concurrent uplink transmission of data packets will occur. The data packet received by the base site will then be a combination of multiple transmissions and will not correspond to any of the individual packets. This action is referred to as a "collision" and requires that each individual subscriber unit attempt to retransmit its data packet. Other variations of the slotted-ALOHA scheme attempt to minimize or eliminate the collision problem by designating or reserving a given time slot or series of time slots for use by a specific subscriber unit (Tannenbaum, page 271).

These schemes have properties that make them inappropriate for some applications and systems. The slotted-ALOHA technique is not efficient for sending large packets that require multiple time slots to transmit. Because each part or segment of the packet is sent independently of the others, significant bandwidth is wasted repeating overhead information, such as identification information, routing information, and information related to packet re-assembly. The unit must also contend before sending each of the segments, meaning more delay. Techniques based on reserving time slots generally require more overhead, particularly on the downlink channel where information is broadcasted that describes who has been granted a reservation and for how long.

Thus, as packet-switched data communication becomes more and more popular, there is a need for developing a method and system for providing more efficient data throughput and minimizing delay in uplink packet transmission.

BRIEF DESCRIPTION OF THE DRAWINGS

FIGS. 7, 8, 9, and 10 are flow charts showing steps for one embodiment of an uplink packet transmission scheme executed by a subscriber unit in accordance with the method of the present invention.

DETAILED DESCRIPTION OF A PREFERRED EMBODIMENT

The present invention allows single-slot subscriber units, who are capable of transmitting and receiving data on one time slot per TDMA frame, to contend for channel access on any one of the available packet time slots and to transmit on the time slot where contention is won. Thus, a subscriber unit does not have to be assigned to any particular time slot for contention, and the problem of performing load balancing on the time slots is eliminated. This invention also minimizes the packet transmission delay while minimizing use of bandwidth on both the uplink and the downlink channel.

Figure 1:
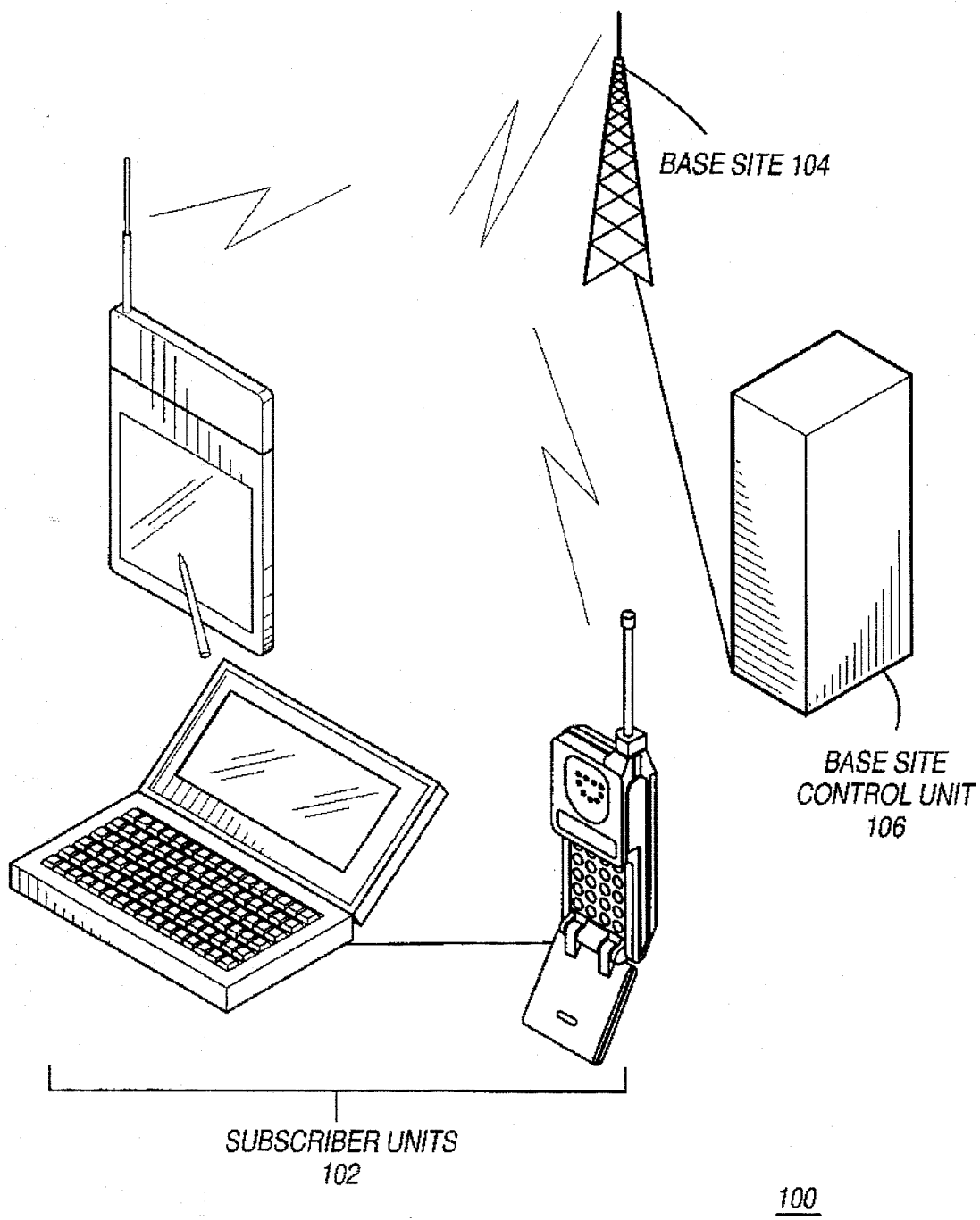
FIG. 1 depicts a communications system with architecture consisting of subscriber units communicating over the air to a base site unit that has wireline access via a base site control unit.

FIG. 1, numeral 100, depicts a communications system with architecture consisting of subscriber units (102) communicating over the air to a base site (104) that has wireline access via a base site control unit (106). The subscriber unit may be a self-contained device capable of communicating directly over the air to a base site, or it may consist of a simple data terminal paired with a second device that provides indirect communication with the base site. The base site performs primarily contention functions and acts as a relay that conveys information between subscriber units and the base site control unit. The base site control unit manages the transport of information between the network and a plurality of base site units. The transmission path from the subscriber units to the base site is called the uplink and the path from the base site to the subscriber units is called the downlink. Using the time-division multiple access (TDMA) transmission technique, a single uplink/downlink channel pair can provide service to a plurality of subscriber units.

Figure 2:
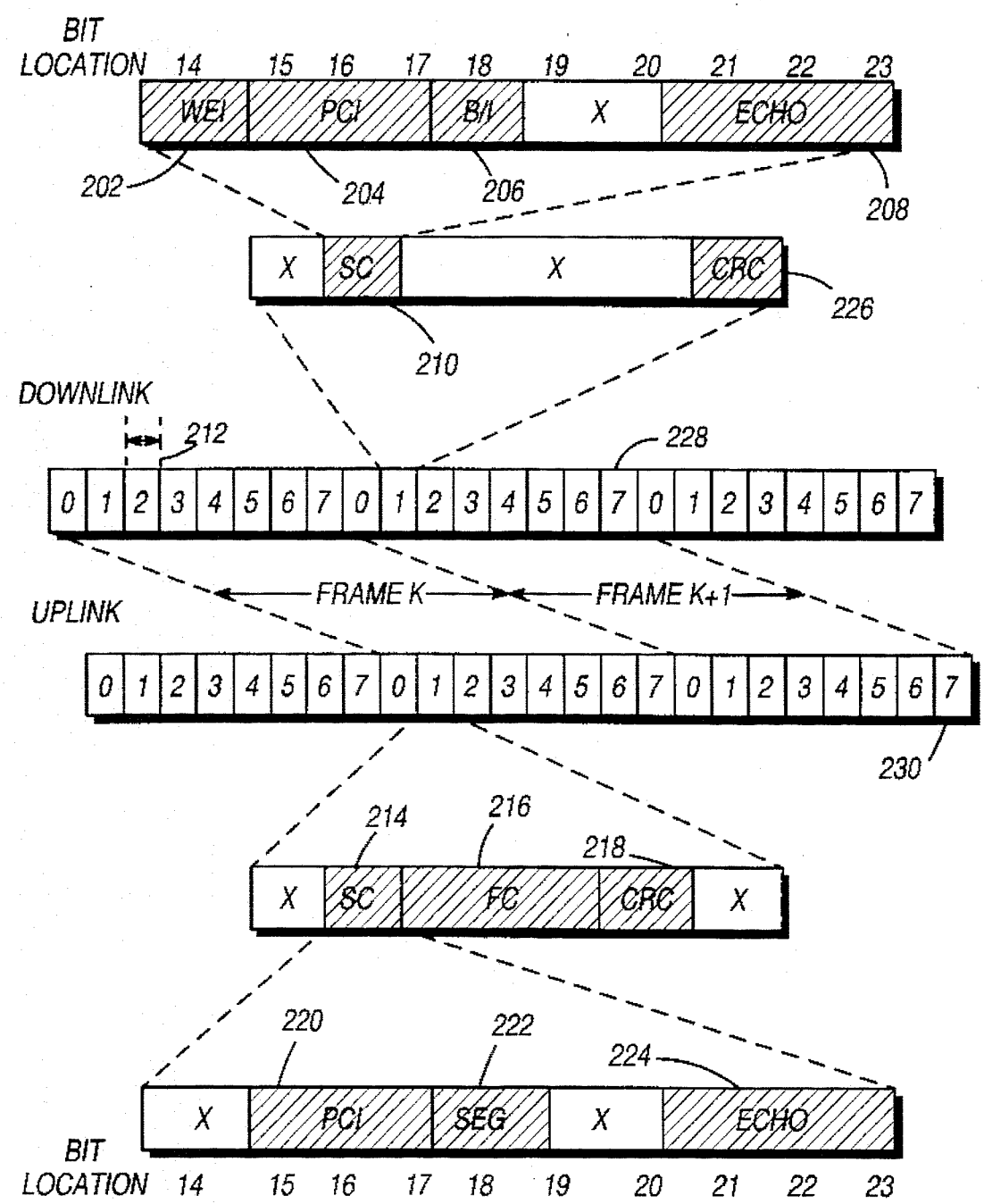
FIG. 2 is a schematic showing an exemplary frame, slot, and slow channel structure for a TDMA system in accordance with the present invention.

FIG. 2, numeral 200, is a schematic showing an exemplary frame, slot, and slow channel structure for a TDMA system in accordance with the present invention. The TDMA technique is characterized by the duration of the time frame and the duration of each time slot (212) within the time frame. These factors generally depend on the system. In the figure shown, both uplink and downlink channels consist of frames containing eight time slots each. The time slots are numbered from 0 to 7. Uplink and downlink frames are skewed such that a downlink frame, number K, occurs a fixed amount of time (approximately nine time slots) before the uplink frame of the same number occurs. The uplink time slot (230) that occurs approximately nine slots after a given downlink time slot (228) is referred to as that downlink time slot's corresponding uplink time slot. Similarly, the downlink time slot that occurs approximately nine time slots before a given uplink time slot will be referred to as that uplink time slot's corresponding downlink time slot. The invention describes procedures executed by a subscriber unit for transmiting data on a single, same-numbered, uplink time slot in successive frames while possibly receiving data on the same-numbered downlink time slot. This type of subscriber unit is referred to as a single-slot subscriber unit. In a packet-switched data transmission system, the single-slot subscriber unit must be able to determine whether the uplink channel is designated for packet transmission, whether the current status of the uplink channel is busy or idle, and whether a request for access to the uplink channel has been granted. A slow channel is typically a small portion of a time slot that carries control information. FIG. 2 illustrates the slow channel bit fields that must be read or modified by the single-slot subscriber unit. The present invention defines a procedure for reading downlink slow channel (210) and modifying uplink slow channel (214) bit fields. To access a slot on the uplink channel, the subscriber unit is required to read a same numbered downlink time slot. In each downlink time slot, the PCI field (204) of the slow channel indicates to the subscriber unit whether the uplink time slot with the same number is designated for packet transmission. Subscriber units are not permitted to transmit on time slots that are not designated for packet transmission. The downlink B/I field (206) of a time slot indicates the current status of the uplink time slot with the same number: either busy (in use) or idle (available). The base site typically inserts a three bit random number read from the ECHO field (224) of the uplink time slot two frames ago into the ECHO field (208) of the same numbered downlink slot. To transmit on a time slot that is busy, a subscriber unit is required to win a contention. If an uplink time slot is designated for packet transmission and is also unused, then the subscriber unit may transmit an access request on the uplink time slot. The access request, hereafter referred to as the header segment, typically consists of routing and identification information, and may also include all or the first portion of the packet the subscriber unit is transmitting. The header segment occupies the fast channel, which is a major portion of the time slot which carries primarily user information (216). The remainder of the uplink time slot may include error detection bits that are the result of a Cyclic Redundancy Check (CRC) (218) computation. The CRC field is used by the base site to determine whether data was corrupted during transmission from a subscriber. The base relays this information back to the subscriber unit in the WEI or Word Error Indication (202) field. The base site writes either a '0' or a '1' into the WEI field, depending on whether it determines the data to be correct or incorrect. The downlink CRC (226) provides a similar function for transmissions from the base site to the subscriber unit. When sending the header segment to the base site, the subscriber unit writes data into the fields of the uplink slow channel to indicate a packet transmission. The subscriber unit writes a value, e.g., '100' into the PCI field (220), writes '00' into the SEG field (222) to indicate a header segment, and a three bit random number into the ECHO field (224) of the uplink slot.

Figure 3:
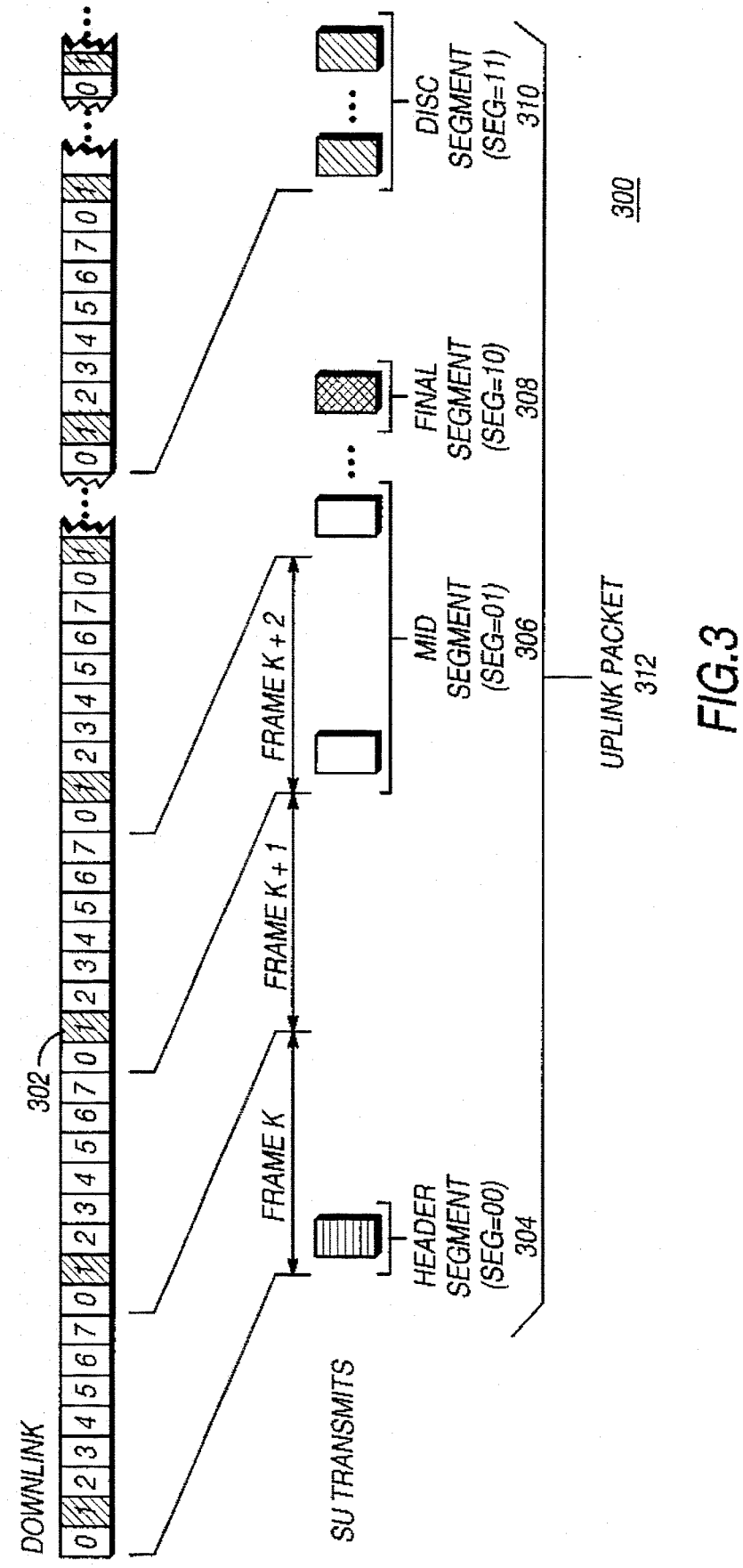
FIG. 3 is a schematic showing the transmission of an uplink packet using an exemplary frame and slot structure for a TDMA system in accordance with the present invention.

FIG. 3, numeral 300, is a Schematic showing the transmission of an uplink packet (312) using an exemplary frame and slot structure for a TDMA system in accordance with the present invention. Packet transmission is accomplished by sending one part or segment of the packet during a time slot. The header segment is transmitted first, in uplink frame k. The next segment is transmitted in uplink frame k+2, in the same time slot. The subscriber unit continues to transmit segments in the same time slot of every uplink time frame thereafter until it has completed sending its packet, i.e., it transmits in frames k+3, k+4, etc. There are four types of segments. As mentioned previously, the first segment of the packet is the header segment (304), and is indicated by writing '00' into the SEG field of the uplink slow channel. All segments of the packet transmitted after the header segment but before the final segment are indicated by writing '01' into the SEG field and are called middle (MID) segments (306). Writing '10' into the SEG field indicates that the current uplink segment is the final segment (308) of the packet, and writing '11' into the SEG field indicates that the current segment is the disconnect (DISC) segment (310). Because uplink and downlink frames are skewed, the WEI data received on the downlink, e.g., in frame K+2 (302), indicates the error status of the uplink transmission that occurred two frames earlier, in frame K (304). WEI data is used to determine whether uplink segments should be re-transmitted.

Figure 4A:
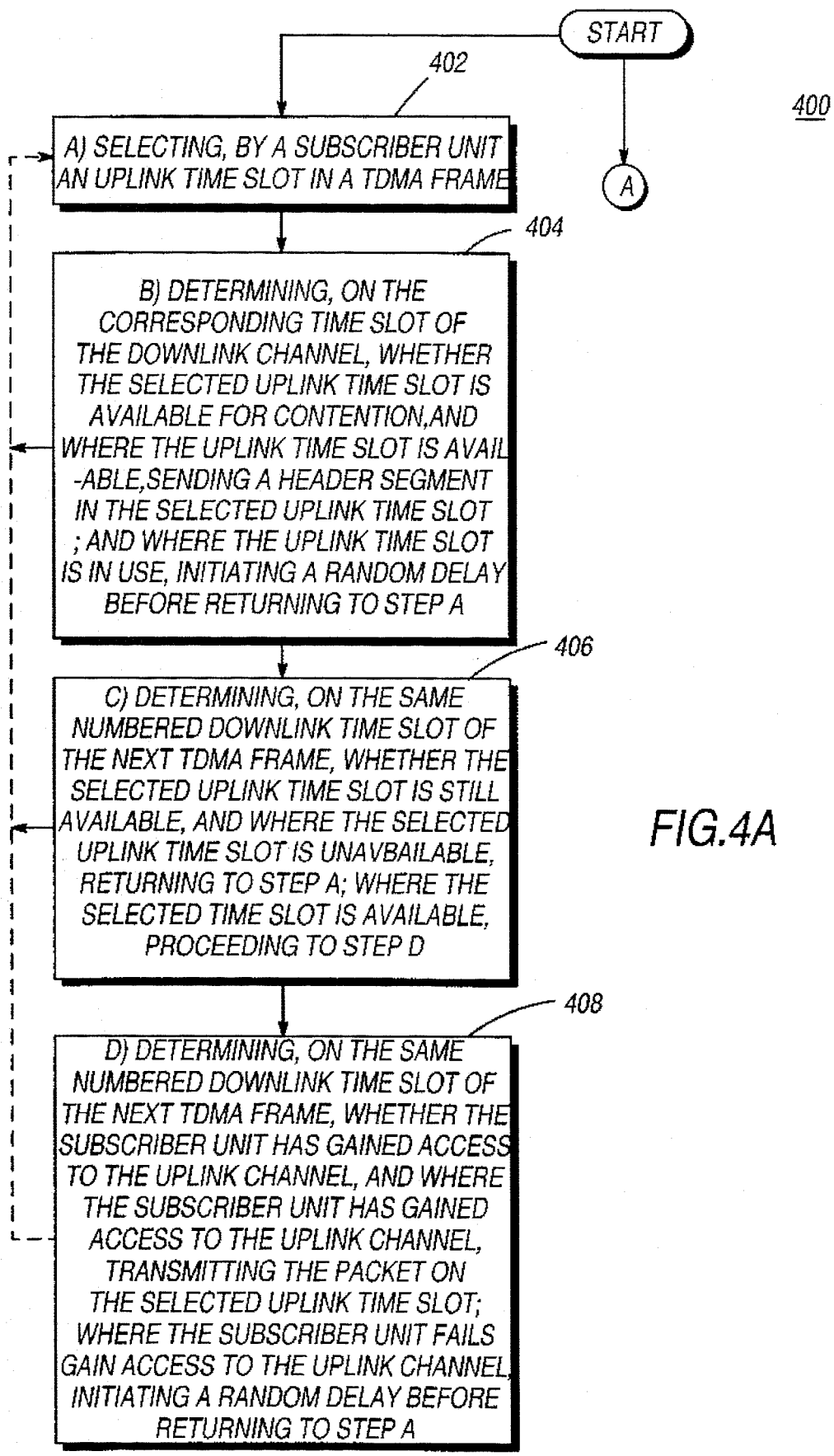
FIG. 4 is a flow chart of steps of a method for utilizing a novel scheme for controlling uplink contention in a TDMA system in accordance with the present invention.
Figure 4B:
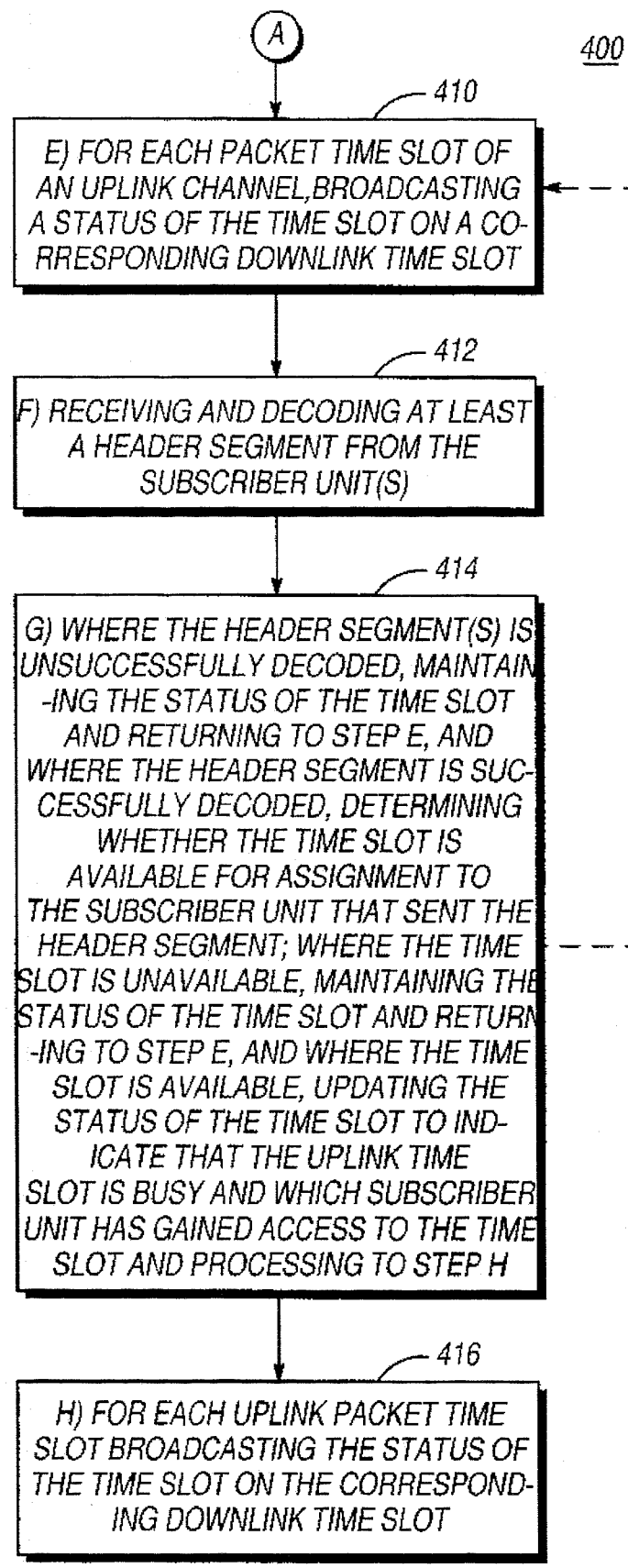

FIG. 4, numeral 400, is a flow chart of one embodiment of the steps of the novel scheme for controlling uplink contention in a TDMA communication system in accordance with the present invention. The novel scheme utilizes parallel performance by the plurality of subscriber units and the base site. Each subscriber unit performs the steps of: A) selecting, by a subscriber unit, an uplink time slot in a TDMA frame (402); B) determining, on the corresponding time slot of the downlink channel, whether the selected uplink time slot is available for contention (404), and where the uplink time slot is available, sending a header segment in the selected uplink time slot; and where the uplink time slot is in use, initiating a random delay before returning to step A; C) determining, on the same numbered downlink time slot of the next TDMA frame, whether the selected uplink time slot is still available (406), and where the selected uplink time slot is unavailable, initiating a random delay before returning to step A; where the selected time slot is available, proceeding to step D; and D) determining, on the same numbered downlink time slot of the next TDMA frame, whether the subscriber unit has gained access to the uplink channel, and where the subscriber unit has gained access to the uplink channel, transmitting the packet on the selected uplink time slot; where the subscriber unit fails to gain access to the uplink channel, initiating a random delay before returning to step A (408). Meanwhile, the base site performs the steps of: E) for each packet time slot of an uplink channel, broadcasting a status of the time slot on a corresponding downlink time slot (410); F) receiving and decoding at least a header segment from the subscriber unit(s) (412); G) where the header segment(s) is unsuccessfully decoded, maintaining the status of the time slot and returning to step E, and where the header segment is successfully decoded, determining whether the time slot is available for assignment to the subscriber unit that sent the header segment; where the time slot is unavailable, maintaining the status of the time slot and returning to step E, and where the time slot is available, updating the status of the time slot to indicate that the uplink time slot is busy and which subscriber unit has gained access to the time slot and proceeding to step H (414); H) for each uplink packet time slot, broadcasting the status of the time slot on the corresponding downlink time slot (416).

Figure 5A:
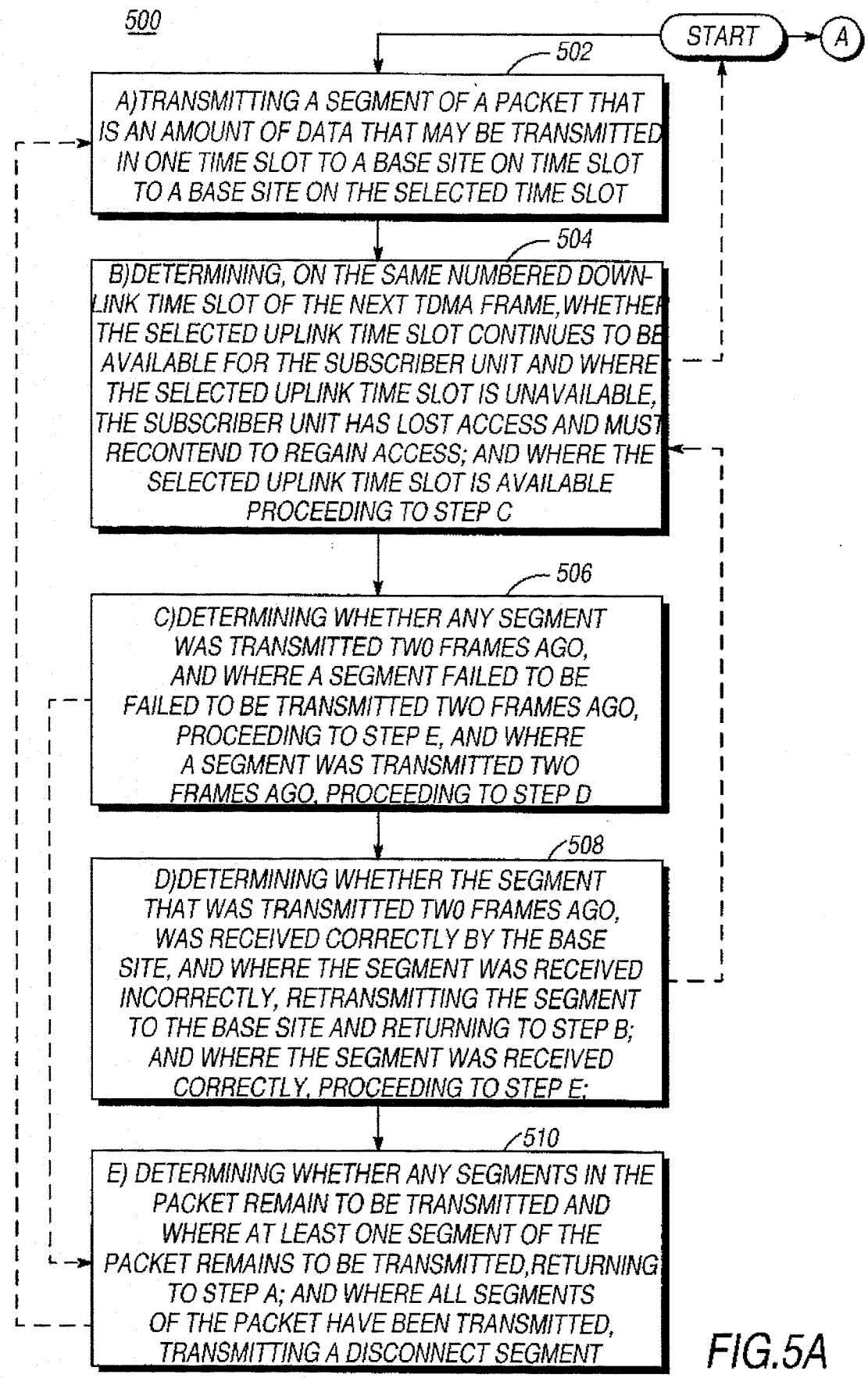
FIG. 5 is a flow chart of steps of a method for utilizing a novel scheme for controlling packet transmission in a TDMA communication system in accordance with the present invention.
Figure 5B:
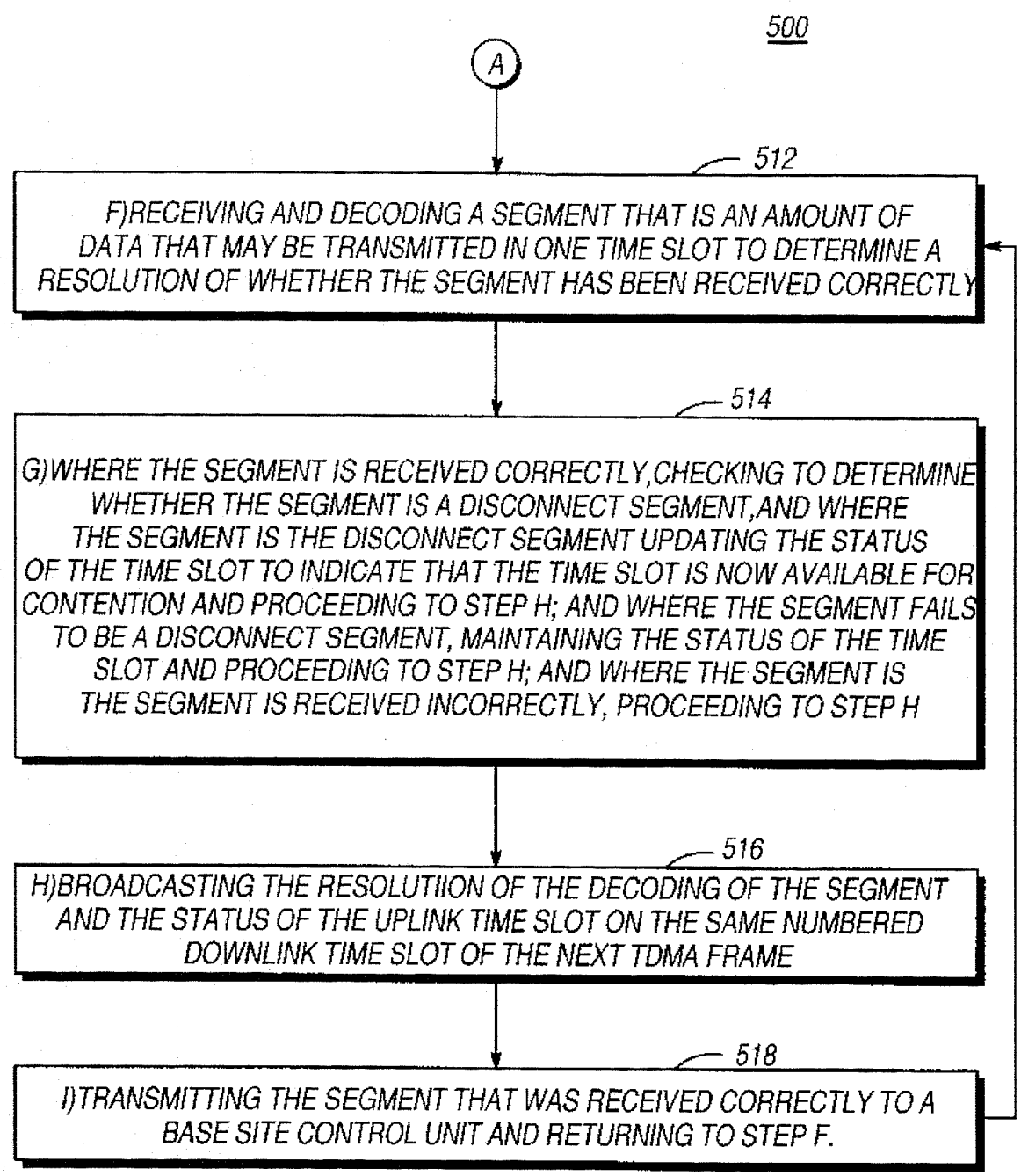

FIG. 5, numeral 500, is a flow chart of one embodiment of the steps of the novel scheme for controlling uplink contention in a time division multiple access communication system in accordance with the present invention. The novel scheme utilizes parallel performance by the plurality of subscriber units and the base site. Each subscriber unit performs the steps of A) transmitting a segment of a packet that is an amount of data that may be transmitted in one time slot to a base site on the selected time slot (502); B) determining, on the same numbered downlink time slot of the next TDMA frame, whether the selected uplink time slot continues to be available for the subscriber unit (504) and where the selected uplink time slot is unavailable, the subscriber unit has lost access and must recontend to regain access; and where the selected uplink time slot is available, proceeding to step C; C) determining whether any segment was transmitted two frames ago (506), and where a segment failed to be transmitted two frames ago, proceeding to step E, and where a segment was transmitted two frames ago, proceeding to step D; D) determining whether the segment that was transmitted two frames ago was received correctly by the base site (508), and where the segment was received incorrectly, re-transmitting the segment to the base site and returning to step B; and where the segment was received correctly, proceeding to step E; E) determining whether any segments in the packet remain to be transmitted (510) and where at least one segment of the packet remains to be transmitted, returning to step A; and where all segments of the packet have been transmitted, transmitting a disconnect segment. Meanwhile the base site performs the steps of: F) receiving and decoding a segment that is an amount of data that may be transmitted in one time slot to determine a resolution of whether the segment has been received correctly (512); G) where the segment is received correctly, checking to determine whether the segment is a disconnect segment (514), and where the segment is the disconnect segment, updating the status of the time slot to indicate that the time slot is now available for contention and proceeding to step H; and where the segment fails to be a disconnect segment, maintaining the status of the time slot and proceeding to step H; and where the segment is received incorrectly, proceeding to step H; H) broadcasting the resolution of the decoding of the segment and the status of the uplink time slot on the same numbered downlink time slot in the next TDMA frame (516). I) transmitting the segment that was received correctly to a base site control unit and returning to step F (518).

Figure 6:
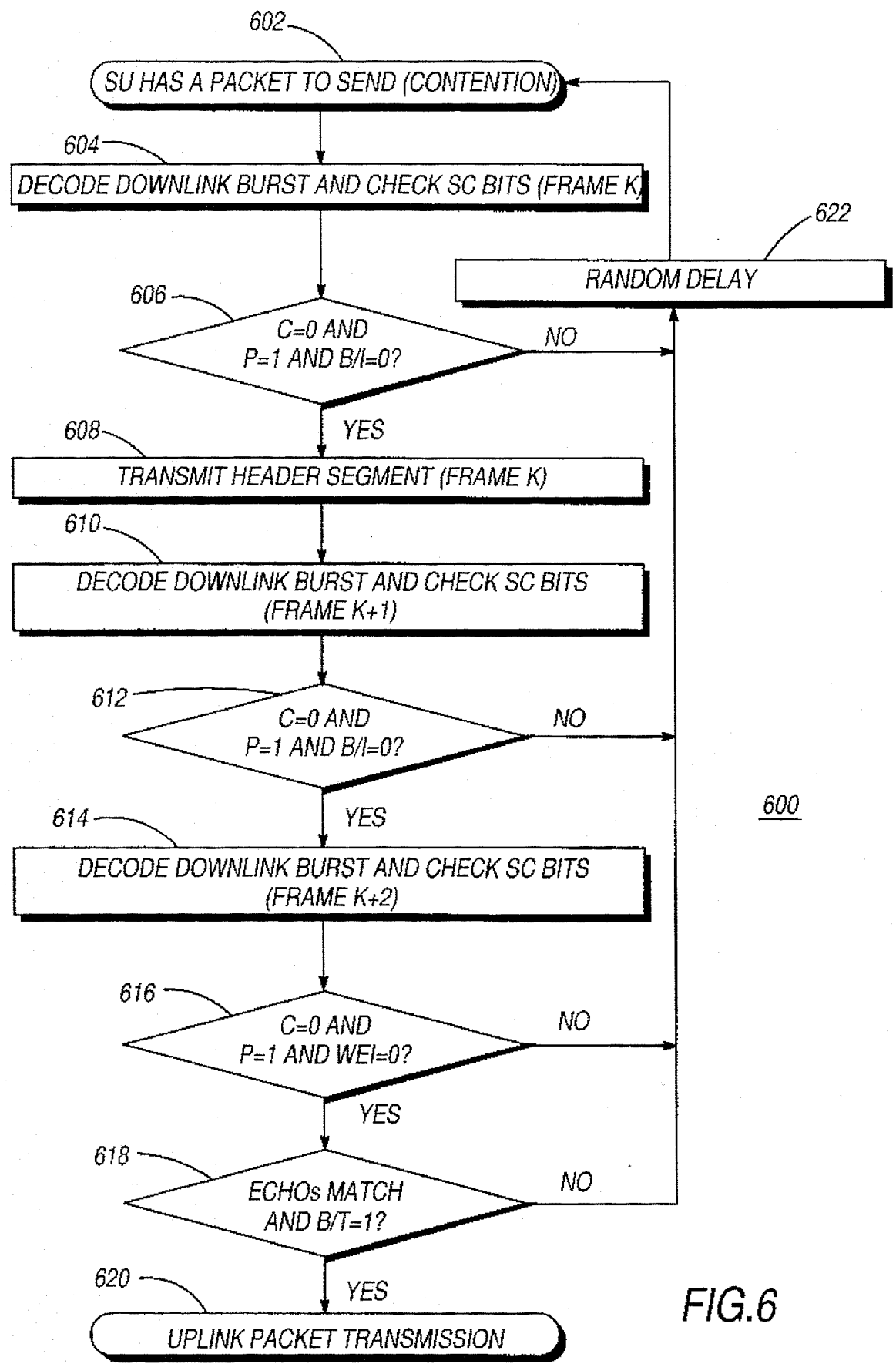
FIG. 6 is a flow chart showing steps for one embodiment of an uplink contention scheme executed by a subscriber unit in accordance with the method of the present invention.
Figure 7:
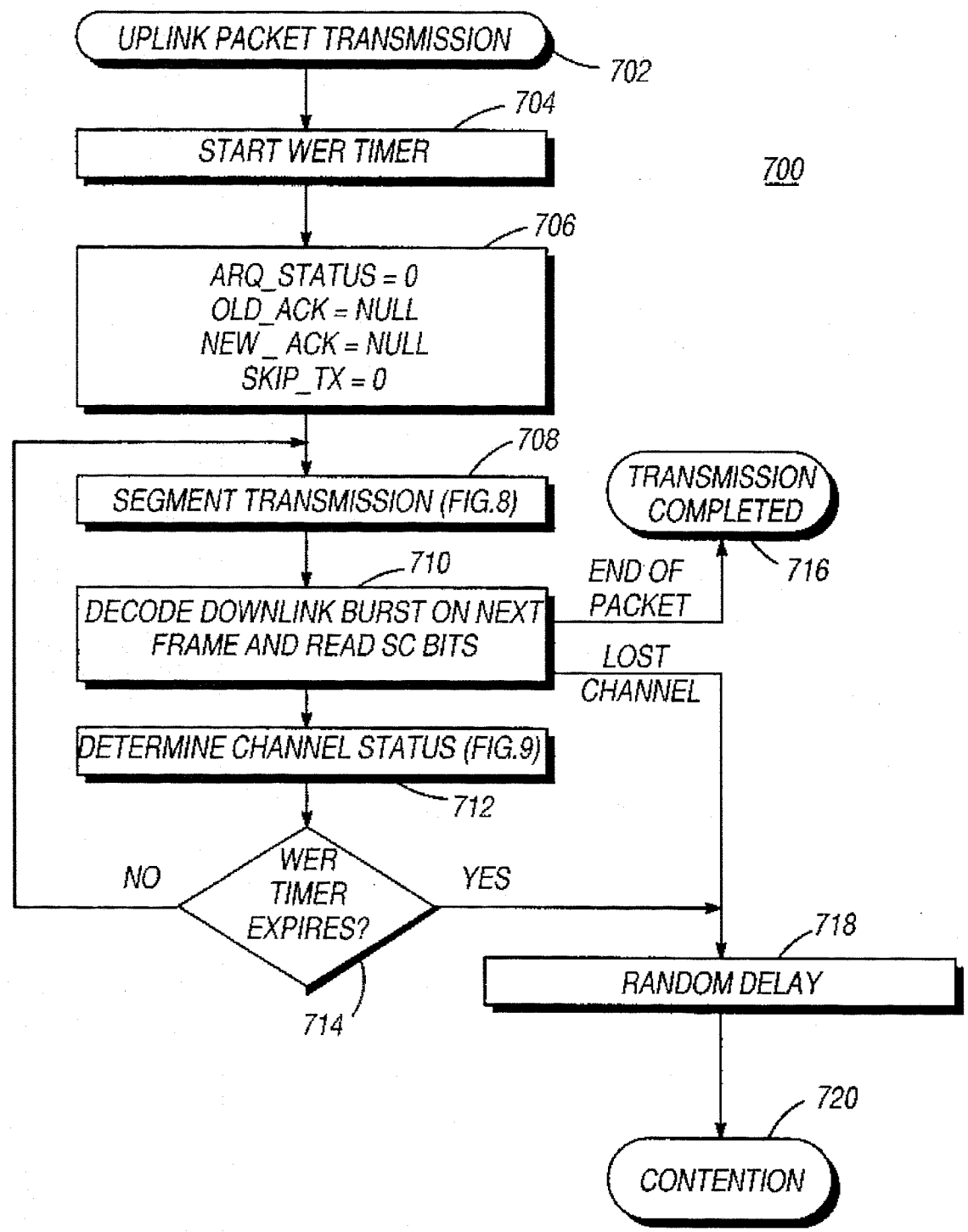

FIG. 6, numeral 600, is a flow chart showing steps for one embodiment of an uplink contention scheme executed by a subscriber unit in accordance with the method of the present invention. The subscriber unit begins this access procedure anew when initially accessing the channel per each uplink packet. Upon desiring to transmit a new packet (602), the subscriber unit selects a time slot (e.g., in frame k) to contend for channel access. The subscriber unit then receives and decodes the data in the corresponding downlink time slot (604). Where the decoding is successful, i.e., the cyclical redundancy code checks (C=0), and the slow channel indicates that the selected time slot is an idle packet time slot (P=1 and B/I=0) (606), the subscriber unit proceeds to transmit a header segment (608). Where any of the above conditions is false (i.e., C=1 or P=0 or B/I=1) (606), the subscriber unit waits a random period of time (622) before contending again on the same or a different time slot (602). After transmitting the header segment (608), the subscriber unit waits one frame before decoding the same numbered downlink time slot of frame k+1 to determine the status of the corresponding uplink time slot (610).

Where the decoding is again successful (C=0) and the slow channel indicates that the time slot continues to be an idle packet time slot (P=1 and B/I=0) (612), the subscriber unit waits one more frame before reading the same numbered downlink time slot of frame k+2 (614). Where any of the above conditions is false (i.e., C=1 or P=0 or B/I=1) (612), the subscriber unit waits a random period of time (622) before returning to the beginning of the contention procedure (602).

Next, in frame k+2, the subscriber unit decodes the same numbered downlink time slot and checks the slow channel bit to determine whether it has gained access to the uplink channel (614). Where the decoding is successful (C=0) and the slow channel indicates the following: the time slot continues to be an packet time slot (P=1); the word error indication bit indicates that the segment transmitted 2 frames ago (i.e., the header segment) was received correctly by the base site (WEI=0) (616); the ECHO bits in the slow channel match the ECHO bits transmitted by the subscriber unit; and the time slot is now busy (B/I=1) (618), the subscriber unit has gained access to the uplink channel and may begin the uplink packet transmission procedure (620) described for FIGS. 7, 8, 9, and 10. Where any of the above conditions is false (i.e., C=1, or P=0, or WEI=1 (616), or ECHOs mismatch, or B/I=(618), the subscriber unit waits a random period of time (622) before returning to the beginning of the contention procedure (602).

FIGS. 7, 8, 9, and 10 numeral 700, 800, 900, and 1000 respectively, are flow charts showing steps for one embodiment of an uplink packet transmission scheme executed by a single-slot subscriber unit in accordance with the method of the invention. The subscriber unit, after gaining access to the uplink channel of the time slot selected (620), begins to transmit segments of the packet using a selective repeat ARQ scheme. The WEI bit in the slow channel of the downlink time slot received in frame k is used to indicate to the subscriber unit whether a segment transmitted in frame k-2 was received correctly by the base site. Segments received in error are re-transmitted as early as possible by the subscriber unit. The subscriber unit maintains a timer, the WER Timer, to control the maximum time interval that it may own the uplink time slot without successfully receiving positive acknowledgment for an uplink segment. The subscriber unit aborts the packet transmission when the value of this timer exceeds a pre-determined threshold. The subscriber unit also maintains a set of queues and variables. Original segments of a packet are stored in the Tx queue except the FINAL and the DISC segments. Segments to be re-transmitted are stored in the ReTx queue. When a segment is transmitted, it is stored in the new_ack queue. This queue can store only one segment. Therefore when a segment is transmitted, the segment currently stored in the new_ack queue is moved to the old_ack queue to make room for the newly transmitted segment.

After successfully gaining access to the uplink channel, the subscriber unit begins the packet transmission procedure (702) by starting the WER timer (704). The subscriber unit then initializes its queues and variables (706). The old_ack and new_ack queues are both set to NULL, a value which indicates the queue is empty. The variable skip_tx is set to '0'. This variable, when equals to '1', causes the subscriber unit to skip the transmission in the current frame. The variable ARQ_status is set to '0'. This variable is encoded as follows:

0: normal state;

1: a FINAL segment has been positively acknowledged;

2: all segments, except the DISC segment, have been positively acknowledged;

3: a DISC segment has been transmitted.

Figure 8:
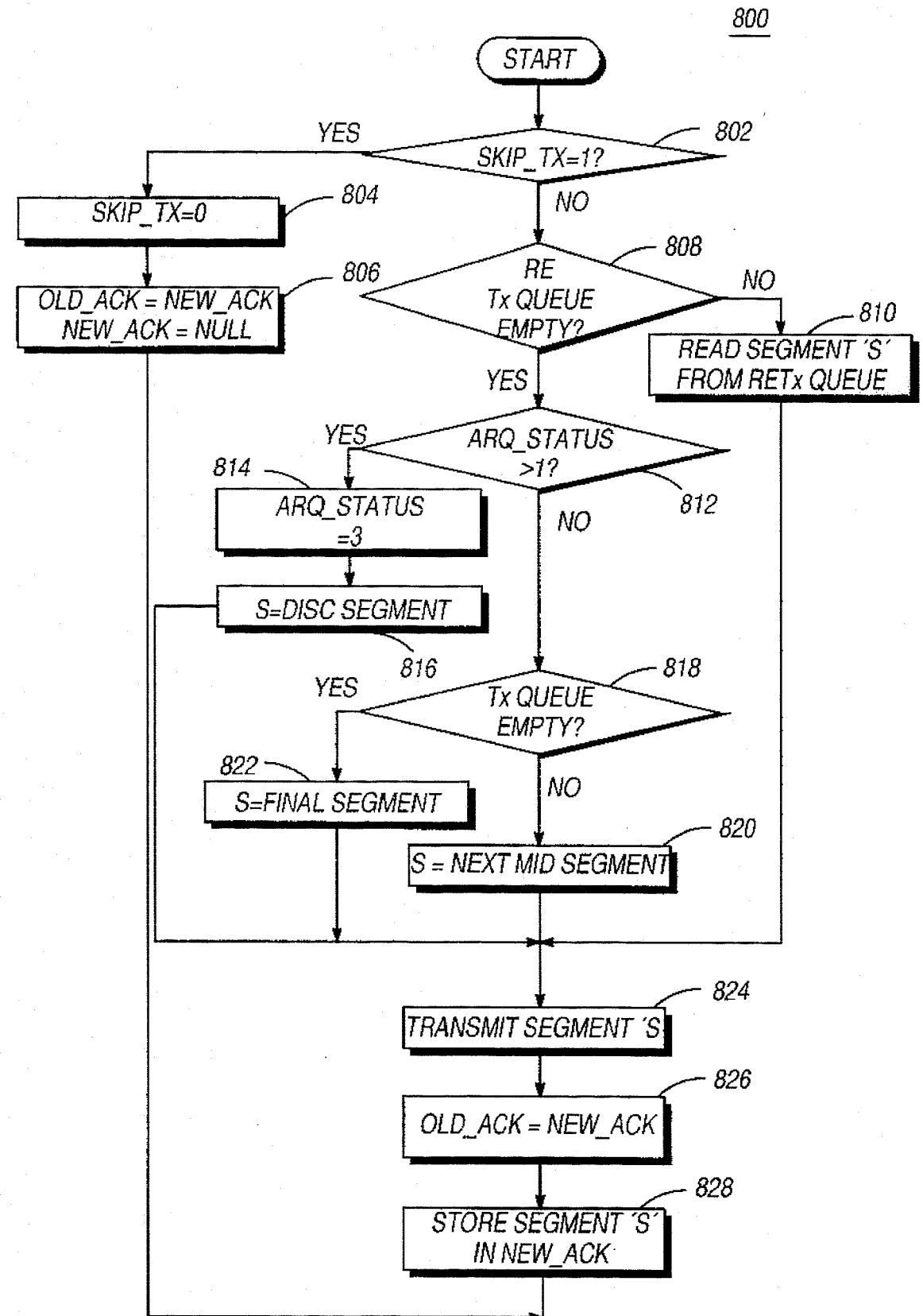

After the initialization process, the subscriber unit executes the "Segment Transmission" process shown in FIG. 8. The subscriber unit first checks the skip_tx flag (802). Where skip_tx is '1' the subscriber unit skips transmitting a segment in the current frame. It moves the segment currently stored in new_ack to old_ack, sets new_ack to NULL (806), resets skip_tx to '0' (804), and proceeds to the next frame (710). Where skip_tx is '0', the subscriber unit determines which segment to transmit. It does so by first checking the ReTx queue (808). Where the ReTx queue contains at least one segment (810), the subscriber unit removed the oldest segment (e.g., segment s) from the queue and transmits that segment (824). Where the ReTx queue is empty, the subscriber unit reads the ARQ_status and checks the Tx queue (818). Where ARQ_status is greater than '1' which indicates that all segments have been transmitted successfully, ARQ_status is set to '3' (814) and a DISC segment (816) is transmitted (824). Where ARQ status is less than or equal to '1' and the Tx queue is empty, a FINAL segment (822) is transmitted (824). Where ARQ_status is less than or equal to '1' and the Tx queue contains at least one segment, the next segment in the Tx queue (segment s=next MID seg) (820) is removed from the queue and transmitted (824). After transmitting a segment, segment s, the subscriber unit moves the segment currently stored in the new_ack queue to the old_ack queue (826) and then stores segment s in the new_ack queue (828).

Figure 10:
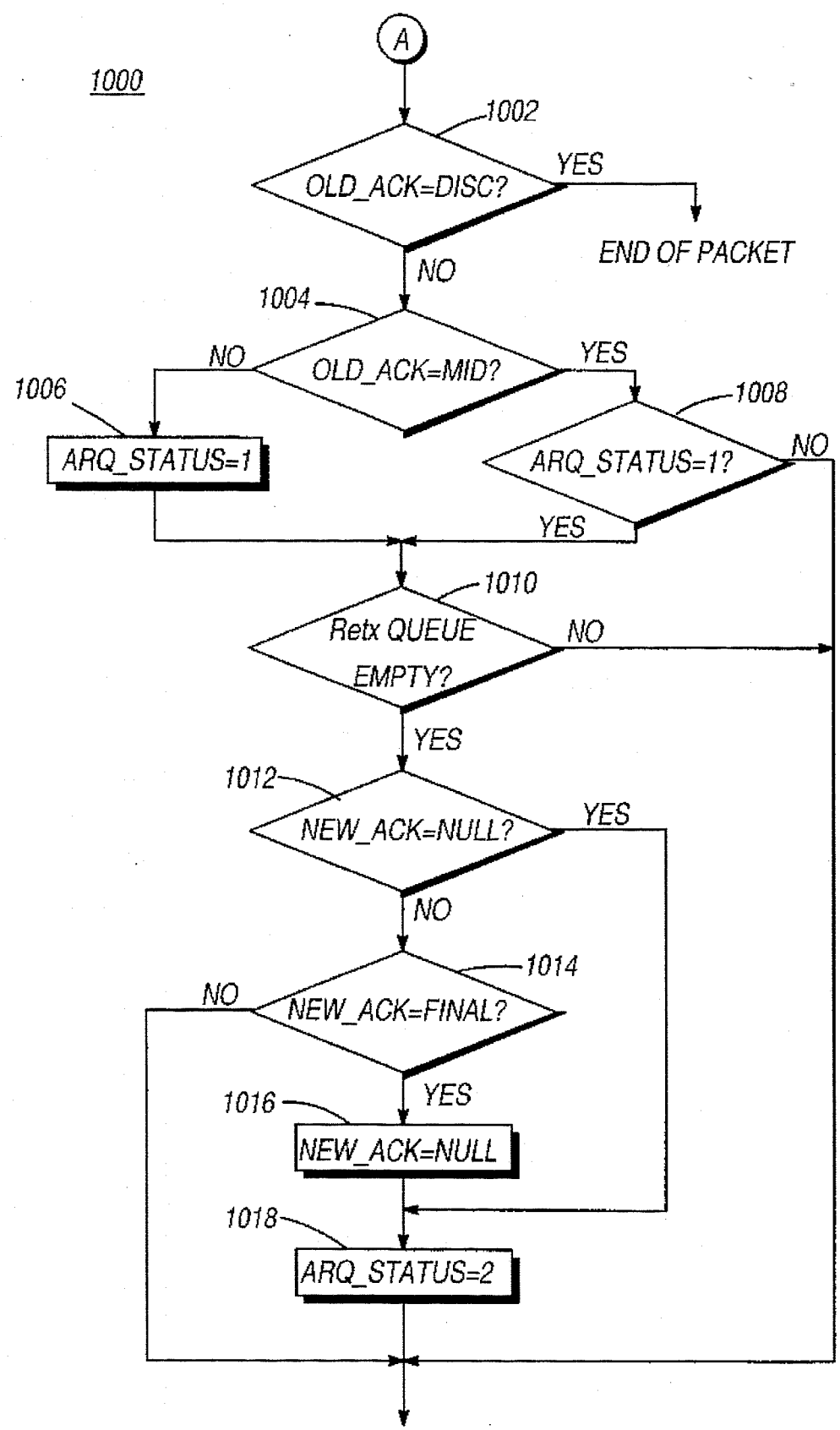

On the following frame (e.g., frame k+2+i, where i=0 at the start of this procedure), the subscriber unit decodes the downlink time slot, reads the slow channel (710), and executes the process "Determine Channel Status" shown in FIGS. 9 and 10. Where the decoding is unsuccessful and ARQ_status is equal to '3' (920), the packet transmission is completed (716). Where the decoding is unsuccessful and ARQ_status is less than '3' (920), the subscriber unit sets skip_tx to '1' (922) so that transmission in this frame will be skipped (see 802). The status of the old_ack queue is then checked. Where old_ack is empty (924), which indicates that the subscriber unit failed to transmit a segment 2 frames ago and therefore expects no acknowledgment in the current frame, the subscriber unit proceeds to check the WER Timer (714). Where old_ack contains a segment (924), the subscriber unit moves the segment to the ReTx queue (926) so that it can be retransmitted in the "Segment Transmission" process (708) and sets old_ack equal to NULL (928).

Where the decoding is successful (CRC ok; 902), the subscriber unit checks the PCI field in the slow channel to determine whether the time slot continues to be a packet time slot (904). Where the time slot is a non-packet time slot, the subscriber unit has lost access to the channel. It waits a random period of time (718) before returning to the beginning of the contention procedure to re-transmit the packet (720). Where the time slot is a packet time slot, the subscriber unit checks the old_ack queue to determine whether there is a segment awaiting for acknowledgment (906). Where old_ack is empty, the subscriber unit checks the B/I bit (930). Where B/I equals '1', the subscriber unit proceeds to check the WER Timer (714); and where B/I equals '0', the subscriber unit waits a random period of time (718) before repeating the contention procedure (720). Where the old_ack queue contains a segment, the subscriber unit checks the WEI bit (908) to determine whether the segment in the old_ack queue was transmitted successfully. Where the segment was transmitted unsuccessfully (WEI=1), the subscriber unit moves the segment to the ReTx queue (916, 918). The subscriber unit then checks the B/I bit (930). Where B/I equals '1', the subscriber unit proceeds to check the WER Timer (714); and where B/I equal '0', the subscriber unit waits a random period of time (718) before repeating the contention procedure (720). Where the segment was transmitted successfully (WEI=0), the subscriber unit compares the received ECHO bits with the transmitted ECHO bits (910). Where the both sets of ECHO bits are different, it indicates that the time slot is being used by another subscriber unit, the subscriber unit aborts the packet transmission, waits a random period of time (718) before repeating the contention procedure (720). Where the Echoes are identical, the subscriber unit restart the WER Timer (912) and execute the "Update ARQ Status" process (914) as shown in FIG. 10 and as described below: The subscriber unit first checks the segment stored in the old_ack queue (1002, 1004), which is also the segment being positively acknowledged by the WEI bit, to determine whether the segment is a DISC, MID, or FINAL segment. Where the segment is a DISC segment, the subscriber unit completes the packet transmission procedure (716). Where the segment is a FINAL segment (1006), the subscriber unit sets ARQ_status to '1' to indicate that a FINAL segment has been successfully transmitted, and proceeds to checks the status of the ReTx queue (1010). Where the segment is a MID segment (1008) and ARQ_status is other than '1', the subscriber unit proceeds to check the B/I bit (930). Where the segment is a MID segment (1008) and ARQ_status is '1', the subscriber unit proceeds to checks the status of the ReTx queue. Where the ReTx queue is empty, the subscriber unit checks the new_ack queue (1012, 1014) in order to delete any remaining FINAL segment awaiting for acknowledgment. Where the new_ack queue is either empty or contains a FINAL segment, new_ack is set to NULL (1016) and the ARQ_status is updated to '2' (1018) to indicate that all segments of the packet, except the DISC segment, have been successfully transmitted. Where the new_ack queue contains a MID segment, ARQ_status remains to be '1', the subscriber unit proceeds to check the B/I bit (930). After executing the process "Update ARQ Status" (914) of FIG. 10, the subscriber unit checks the B/I bit (930). Where B/I equals '1', the subscriber unit proceeds to check the WER Timer (714); and where B/I equal '0', the subscriber unit waits a random period of time (718) before repeating the contention procedure (720).

After executing the process "Determine Channel Status" (712) of FIGS. 9 and 10, the subscriber unit checks the WER Timer (714). Where the timer expires, the subscriber unit aborts the packet transmission, waits a random period of time (718) before returning to the beginning to contention procedure to re-transmit the packet (720). Where the value of the timer is less than or equal to a pre-determined threshold, the subscriber unit continues the packet transmission procedure by returning to execute the "Segment Transmission" process (708).

Figure 11:
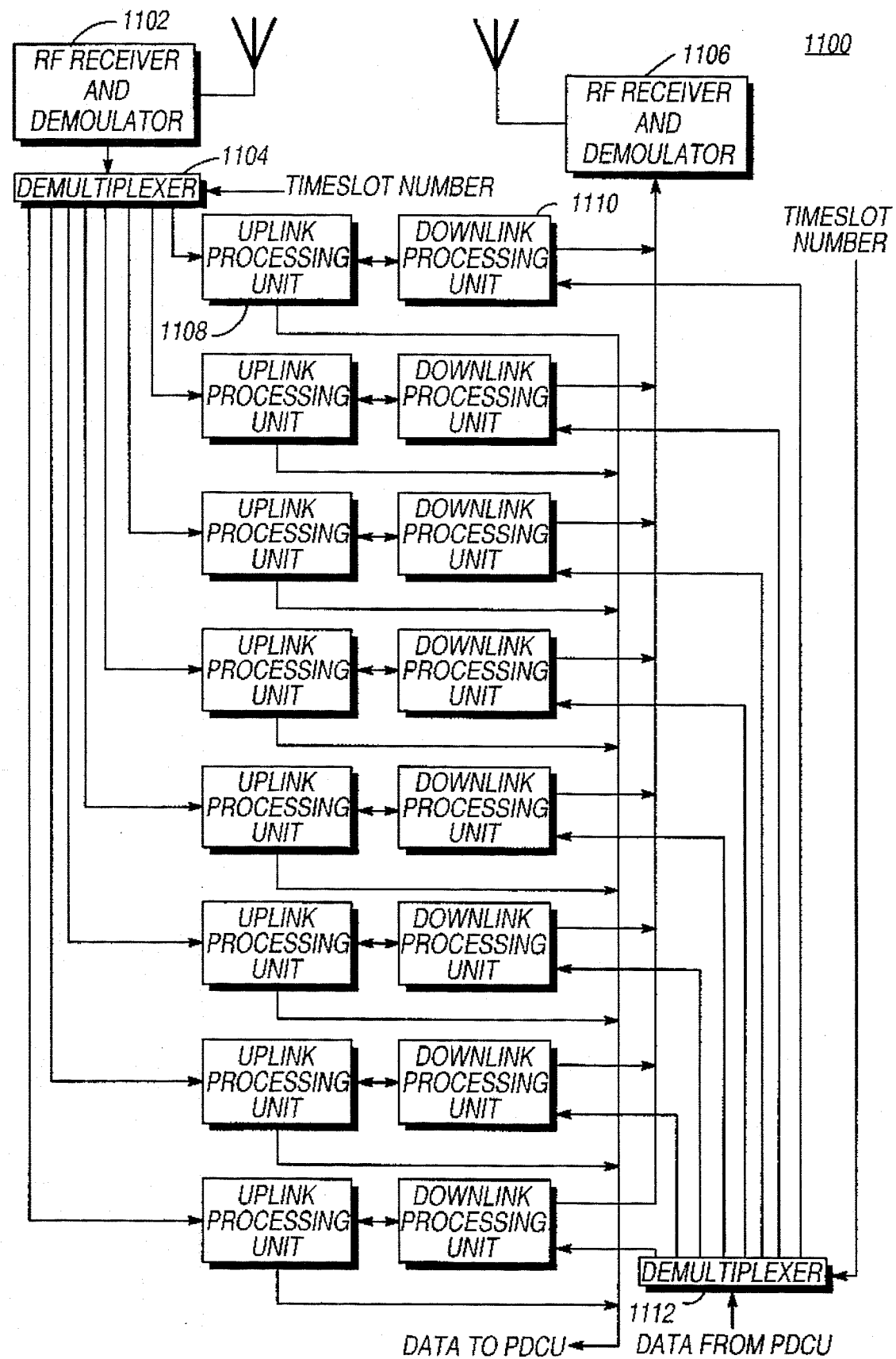
FIG. 11 is a block diagram showing one implementation of a base site in accordance with the present invention.
Figure 12:
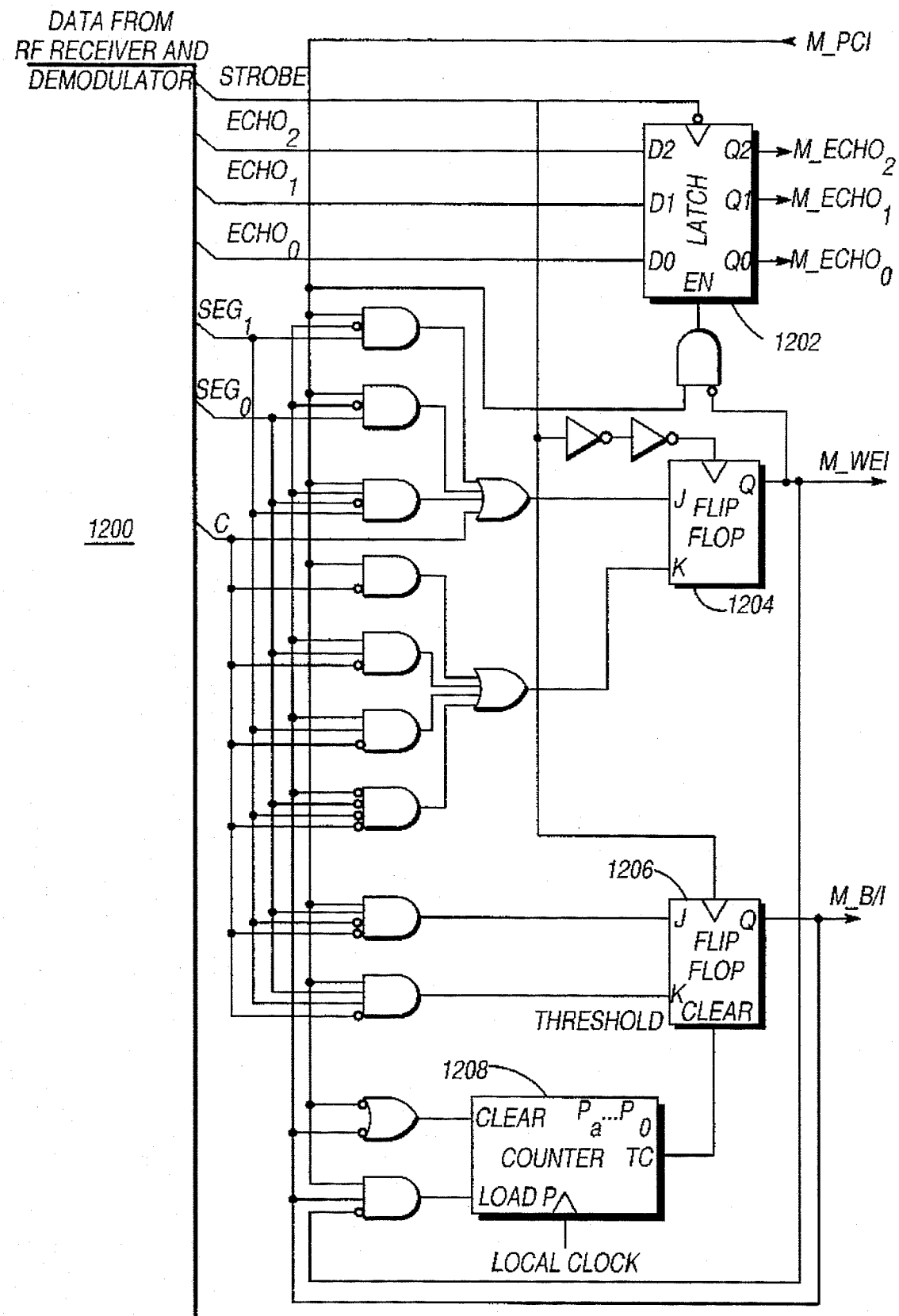
FIG. 12, is a detailed circuit diagram of an uplink processing unit shown in FIG. 11.
Figure 13:
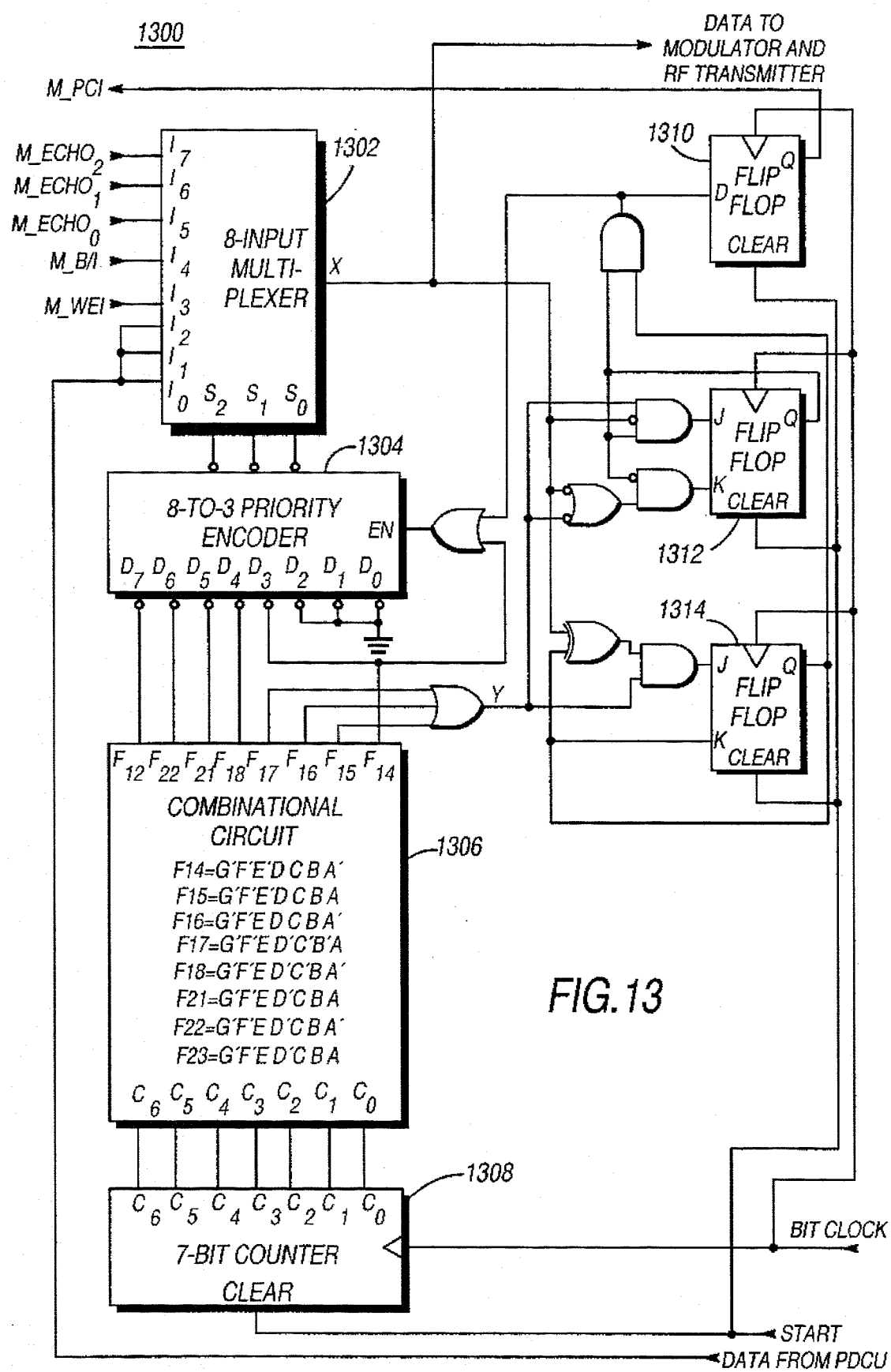
FIG. 13, is a detailed circuit diagram of an downlink processing unit shown in FIG. 11.

FIGS. 11, 12, and 13 are a schematic showing of one implementation of a base site in accordance with the present invention. The base site contains the following modules: a receiver circuitry (1102) to receive radio signal at an uplink frequency, perform analog-to-digital conversion, and demodulate/decode the time slot data; a transmitter circuitry (1106) to encode/modulate the time slot data, perform digital-to-analog conversion, and transmit the radio signal at a downlink frequency; and 8 coupled uplink-downlink processing units (1108, 1110), each corresponding to one time slot, to perform a number of time critical operations on the slow channel bits of both uplink and downlink. Each coupled uplink-downlink processing unit interfaces with the receiver circuitry and the base site control unit via 2 demultiplexers (1104; 1112) which deliver data to the appropriate destinations depending on which time slot is being processed.

FIG. 12, numeral 1200, shows a detailed circuit diagram of an Uplink Processing Unit shown in FIG. 10. The Uplink Processing Unit contains hardware to perform 4 basic functions: ECHO bits processing, WEI bit processing, B/I bit processing, and uplink word error counter processing.

The ECHO bits are copied directly from the slow channel of the input data into the D-Latch (1202) at the falling edge of the strobe signal. This action only occurs when the states of M_PCI and M_WEI are '1' and '0', respectively. This indicates that the current time slot is a packet time slot and the received data was decoded correctly. A 0-to-1 transition on the strobe signal indicates that the input data are valid. Using the falling edge to clock the D-Latch allows time for the M_WEI bit to be updated. The value of the M_PCI bit was set previuosly by the associated Downlink Processing Unit.

The state of the M_WEI bit is set by J-K Flip Flop (1204). It is '1' when any of the following events occurs: 1) the decoding is unsuccessful (C=1), 2) a header segment is received while the time slot is busy (SEG=00 and M_B/I= 1); and 3) a non-header segment is received while the time slot is idle (SEG ≠00 and M_B/I=0).

The state of the M_B/I bit is set by J-K Flip Flop (1206). It changes from '0' to '1' when a header segment is received while the M_PCI indicates the current time slot is a packet slot and the decoding of the uplink time slot is successful (SEG =00 and M_PCI=1 and C=0). The state of M_B/I changes from '1' to '0' when a disconnect segment is received while the M_PCI indicates a packet slot and the decoding is successful (SEG=11 and M_PCI=1 and C=0). The state of M_B/I is cleared whenever the content of the uplink word error counter (1208) reaches a maximum value.

The uplink word error counter (1208) is used to measure the maximum interval that a subscriber unit is allowed to own the uplink without the base site correctly decoding an uplink time slot data. The counter is fed by a local clock of predetermined frequency. The counter is cleared when the current time slot is a non packet time slot (M_PCI=0) or when the time slot is idle (M_B/I=0). The counter is loaded with a predetermined threshold when the decoding is successful while the current time slot is a busy packet time slot (C=1 and M_PCI=1 and M_B/I=1). The combination of the threshold and the clock frequency determines the maximum time interval that the base site continues to keep the time slot busy while unsuccessfully decoding the uplink time slot data.

FIG. 13, numeral 1300, shows a detailed circuit diagram of a Downlink Processing Unit shown in FIG. 11. The Downlink Processing Unit receives time slot data (in serial format) along with a start signal and a bit clock from the base site control unit via a demultiplexer. The Downlink Processing Unit uses a 7-bit counter (1308) and a combinational circuit (1306) to identify the bit location of the slow channel bit being process. Most of the outputs from the combinational circuit are used to select the 8-input Multiplexer (1302) via an 8-to-3 Priority Encoder (1304). The signal Fi is active ('1') when the $i^{th}$ bit (see FIG. 2) arrives at the input of the multiplexer. The multiplexer then decides to either pass this bit unmodified to the transmitter, or replace it with one of the slow channel bits computed during the previous uplink time slot by the associated Uplink Processing Unit. The bit replacement only take places when $F_{14}$ (corresponding to the WEI bit) is active, or after a correct value was detected in the PCI field (e.g., '100' in bit locations 15, 16, and 17). A state machine which is comprised of a number of logic gates and two J-K flip flops (1312 and 1314) is used to detect the PCI bits. A value of '1' is stored in the M_PCI bit by the D Flip Flop (1310) when the correct value in the PCI field is detected.

We claim:

1. A method for providing uplink contention and data transmission for single-slot packet-switched subscriber units in a time division multiple access system, comprising the steps of:

1A) selecting, by a subscriber unit, an uplink time slot in a TDMA frame;

1B) determining, on the corresponding time slot of the downlink channel, whether the selected uplink time slot is available for contention, and where the uplink time slot is available, sending a header segment in the selected uplink time slot; and where the uplink time slot is in use, initiating a random delay before returning to step 1A;

1C) determining, on the same numbered downlink time slot of the next TDMA frame, whether the selected uplink time slot is still available, and where the selected uplink time slot is unavailable, initiating a random delay before returning to step 1A; where the selected time slot is available, proceeding to step 1D;

1D) determining, on the same numbered downlink time slot of the next TDMA frame, whether the subscriber unit has gained access to the uplink channel, and where the subscriber unit has gained access to the uplink channel, transmitting the packet on the selected uplink time slot; where the subscriber unit fails to gain access to the uplink channel, initiating a random delay before returning to step 1A.

2. The method of claim 1 wherein the selecting of step 1A is one of: random and non-random.

3. The method of claim 1 wherein the selected uplink time slot of step 1B is used by one of: circuit-switched traffic and a plurality types of packet-switched traffic.

4. The method of claim 1 further including:

4A) transmitting a segment of a packet that is an amount of data that may be transmitted in one time slot to a base site on the selected time slot;

4B) determining, on the same numbered downlink time slot of the next TDMA frame, whether the selected uplink time slot continues to be available for the subscriber unit; and where the selected uplink time slot is unavailable, initiating a random delay before returning to step 1A, and where the selected uplink time slot is available, proceeding to step 4C;

4C) determining whether any segment was transmitted two frames ago, and where a segment failed to be transmitted two frames ago, proceeding to step 4E, and where a segment was transmitted two frames ago, proceeding to step 4D;

4D) determining whether the segment that was transmitted two frames ago was received correctly by the base site, and where the segment was received incorrectly, retransmitting the segment to the base site and returning to step 4B; and where the segment was received correctly, proceeding to step 4E;

4E) determining whether any segments in the packet remain to be transmitted and where at least one segment of the packet remains to be transmitted, returning to step 4A;

and where all segments of the packet have been transmitted, transmitting a disconnect segment.

5. The method of claim 4 wherein the disconnect segment of step 4E may be transmitted immediately following the final segment, or it may be transmitted after the final segment has been positively acknowledged.

6. The method of claim 1 wherein the method is achieved utilizing a computer software program embodied in a microprocessor.

7. A microprocessor in a subscriber unit directed by a computer program to provide contention and data transmission for single-slot packet-switched subscriber units in a time division multiple access system, wherein the computer program comprises the steps of:

7A) selecting, by a subscriber unit, an uplink time slot in a TDMA frame;

7B) determining, on the corresponding time slot of the downlink channel, whether the selected uplink time slot is available for contention, and where the uplink time slot is available, sending a header segment in the selected uplink time slot; and where the uplink time slot is in use, initiating a random delay before returning to step 7A;

7C) determining, on the same numbered downlink time slot of the next TDMA frame, whether the selected uplink time slot is still available, and where the selected uplink time slot is unavailable, initiating a random delay before returning to step 7A; where the selected time slot is available, proceeding to step 7D;

7D) determining, on the same numbered downlink time slot of the next TDMA frame, whether the subscriber unit has gained access to the uplink channel, and where the subscriber unit has gained access to the uplink channel, transmitting the packet on the selected uplink time slot; where the subscriber unit fails to gain access to the uplink channel, initiating a random delay before returning to step 7A.

8. The microprocessor of claim 7 wherein the selecting of step 7A is one of: random and non-random.

9. The microprocessor of claim 7 wherein the selected uplink time slot of step 7B is used by one of: circuit-switched traffic and a plurality types of packet-switched traffic.

10. The microprocessor of claim 7 further including:

10A) transmitting a segment of a packet that is an amount of data that may be transmitted in one time slot to a base site on the selected time slot;

10B) determining, on the same numbered downlink time slot of the next TDMA frame, whether the selected uplink time slot continues to be available for the subscriber unit; and where the selected uplink time slot is unavailable, initiating a random delay before returning to step 7A, and where the selected uplink time slot is available, proceeding to step 10C;

10C) determining whether any segment was transmitted two frames ago, and where a segment failed to be transmitted two frames ago, proceeding to step 10E, and where a segment was transmitted two frames ago, proceeding to step 10D;

10D) determining whether the segment that was transmitted two frames ago was received correctly by the base site, and where the segment was received incorrectly, retransmitting the segment to the base site and returning to step 10B; and where the segment was received correctly, proceeding to step 10E;

10E) determining whether any segments in the packet remain to be transmitted and where at least one segment of the packet remains to be transmitted, returning to step 10A;

and where all segments of the packet have been transmitted, transmitting a disconnect segment.

11. The microprocessor of claim 10 wherein the disconnect segment of step 10E may be transmitted immediately following the final segment, or it may be transmitted after the final segment has been positively acknowledged.

12. A method for using a base site to provide uplink contention and data transmission for single-slot packet-switched subscriber units in a time division multiple access system, comprising the steps of:

12A) for each packet time slot of an uplink channel, broadcasting a status of the time slot on a corresponding downlink time slot;

12B) receiving and decoding at least a header segment from the subscriber unit(s);

12C) where the header segment(s) is unsuccessfully decoded, maintaining the status of the time slot and returning to step 12A, and where the header segment is successfully decoded, determining whether the time slot is available for assignment to the subscriber unit that sent the header segment; where the time slot is unavailable, maintaining the status of the time slot and returning to step 12A, and where the time slot is available, updating the status of the time slot to indicate that the uplink time slot is busy and which subscriber unit has gained access to the time slot and proceeding to step 12D;

12D) for each uplink packet time slot, broadcasting the status of the time slot on the corresponding downlink time slot.

13. The method of claim 12 wherein the status includes a traffic type, a busy/idle status, and a random number generated by the subscriber unit using the time slot.

14. The method of claim 12 further including:

14A) receiving and decoding a segment that is an amount of data that may be transmitted in one time slot to determine a resolution of whether the segment has been received correctly;

14B) where the segment is received correctly, checking to determine whether the segment is a disconnect segment, and where the segment is the disconnect segment, updating the status of the time slot to indicate that the time slot is now available for contention and proceeding to step 14C; and where the segment fails to be a disconnect segment, maintaining the status of the time slot and proceeding to step 14C; and where the segment is received incorrectly, proceeding to step 14C;

14C) broadcasting the resolution of the decoding of the segment and the status of the uplink time slot on the same numbered downlink time slot in the next TDMA frame.

14D) transmitting the segment that was received correctly to a base site control unit and returning to step 14A.

15. The method of claim 14 wherein the disconnect segment includes a packet identification and a subscriber unit user identification for packet re-transmission.

16. The method of claim 12 wherein the method is achieved utilizing a computer software program embodied in a microprocessor.

17. A microprocessor in a base site directed by a computer program to provide uplink contention and data transmission for single-slot packet-switched subscriber units in a time division multiple access system, wherein the computer program comprises the steps of:

17A) for each packet time slot of an uplink channel, broadcasting a status of the time slot on a corresponding downlink time slot;

17B) receiving and decoding at least a header segment from the subscriber unit(s);

17C) where the header segment(s) is unsuccessfully decoded, maintaining the status of the time slot and returning to step 17A, and where the header segment is successfully decoded, determining whether the time slot is available for assignment to the subscriber unit that sent the header segment; where the time slot is unavailable, maintaining the status of the time slot and returning to step 17A, and where the time slot is available, updating the status of the time slot to indicate that the uplink time slot is busy and which subscriber unit has gained access to the time slot and proceeding to step 17D;

17D) for each uplink packet time slot, broadcasting the status of the time slot on the corresponding downlink time slot.

18. The microprocessor of claim 17 wherein the status includes a traffic type, a busy/idle status, and a random number generated by the subscriber unit using the time slot.

19. The microprocessor of claim 17 further including:

19A) receiving and decoding a segment that is an amount of data that may be transmitted in one time slot to determine a resolution of whether the segment has been received correctly;

19B) where the segment is received correctly, checking to determine whether the segment is a disconnect segment, and where the segment is the disconnect segment, updating the status of the time slot to indicate that the time slot is now available for contention and proceeding to step 19C; and where the segment fails to be a disconnect segment, maintaining the status of the time slot and proceeding to step 19C; and where the segment is received incorrectly, proceeding to step 19C;

19C) broadcasting the resolution of the decoding of the segment and the status of the uplink time slot on the same numbered downlink time slot in the next TDMA frame.

19D) transmitting the segment that was received correctly to a base site control unit and returning to step 14A.

20. The microprocessor of claim 19 wherein the disconnect segment includes a packet identification and a subscriber unit user identification for packet re-transmission.

21. A base site for providing contention function and data transmission between a plurality subscriber units and the base site control unit in a TDMA system, comprising:

a radio frequency receiver and demodulator block for converting the radio signal into digital data and for decoding the received data;

a modulator and radio frequency transmitter block for encoding the data to be transmitted and for converting the encoded data into radio signal; and a plurality of coupled uplink-downlink processing units wherein each of the uplink processing units comprises:

21A) a first state machine for, upon receiving an uplink segment, updating and storing a busy/idle status of the current time slot and a resolution of the decoding of the received segment, 21B) a D-latch logic, coupled to the state machine, for storing a random number received from a subscriber unit;

21C) a counter, coupled to the D-latch and the first state machine, for setting the busy/idle status of the time slot to idle when a predetermined number of consecutive erroneous segments has been detected;

and wherein the downlink processing unit comprises:

21D) a second state machine, coupled to a counter, for detecting and storing a traffic type of a time slot;

21E) a logic unit, coupled to the second state machine, for inserting a channel status which includes the busy/idle status of an uplink time slot, the resolution of the decoding of the previously received segment, and the received random number, into a slow channel field of the segment transmitted in the corresponding downlink time slot.

* * * * *